(12) United States Patent
O'Neil

(10) Patent No.: US 9,092,024 B2
(45) Date of Patent: Jul. 28, 2015

(54) MOTOR SPEED ENHANCEMENT

(75) Inventor: John M. O'Neil, Litchfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 238 days.

(21) Appl. No.: 13/617,794

(22) Filed: Sep. 14, 2012

(65) Prior Publication Data
US 2014/0077747 A1 Mar. 20, 2014

(51) Int. Cl.
*G05B 19/40* (2006.01)
(52) U.S. Cl.
CPC ...................... *G05B 19/40* (2013.01)
(58) Field of Classification Search
CPC ................. G05B 19/40; G05B 2218/41326; H02P 8/14
USPC .................................. 318/685, 696
See application file for complete search history.

(56) References Cited

U.S. PATENT DOCUMENTS

| | | | | |
|---|---|---|---|---|
| 4,025,859 A * | 5/1977 | Smith | ........................... | 318/696 |
| 4,450,394 A * | 5/1984 | Kelleher | ....................... | 318/696 |
| 4,533,861 A * | 8/1985 | Rogers et al. | ................. | 318/696 |
| 5,313,149 A * | 5/1994 | Bahn | ............................. | 318/727 |
| 5,703,458 A * | 12/1997 | Gershen et al. | ................ | 318/799 |
| 6,307,345 B1 * | 10/2001 | Lewis | ........................... | 318/696 |
| 6,563,251 B2 * | 5/2003 | Jansson et al. | ........... | 310/316.03 |

* cited by examiner

*Primary Examiner* — Rina Duda
(74) *Attorney, Agent, or Firm* — Cantor Colburn LLP

(57) ABSTRACT

Embodiments are directed to commanding, by a controller, a step in connection with a stepper motor. Further, embodiments include discharging a current in a coil of the stepper motor by transferring the current to a capacitor coupled to the coil responsive to the commanded step and driving a current in the coil. The driving of the current in the coil includes using charge stored on the capacitor during the discharging of the current in the coil.

18 Claims, 1 Drawing Sheet

MOTOR SPEED ENHANCEMENT

BACKGROUND

In some applications or environments, it may be desirable to increase the operating speed of a motor. For example, in connection with a stepper motor, it may be desirable to increase the operating speed to obtain better fuel control.

When a stepper motor is commanded to step, a current in a polarity changing coil must first be discharged and then driven in the opposite direction. While the current is discharging, the coil continues to exert force on a rotor of the motor.

BRIEF SUMMARY

In some embodiments, a method comprises commanding, by a controller, a step in connection with a stepper motor, discharging a current in a coil of the stepper motor by transferring the current to a capacitor coupled to the coil responsive to the commanded step, and driving a current in the coil by using charge stored on the capacitor during the discharging of the current in the coil.

In some embodiments, a circuit comprises a power source configured to selectively turn-on and turn-off, a first capacitor that is charged by a discharge current associated with a coil when the power source turns-off, and a second capacitor that receives a transfer of charge from the first capacitor to drive a current in the coil from the second capacitor when the power source turns-on.

In some embodiments, a system for enhancing a speed of a stepper motor comprises a controller configured to command a step of the stepper motor, and a circuit configured to discharge a current in a coil of the stepper motor by transferring the current to a capacitor responsive to the commanded step, and drive a current in the coil by using charge stored on the capacitor during the discharging of the current in the coil.

Other embodiments of the disclosure are described below.

BRIEF DESCRIPTION OF THE DRAWINGS

The present disclosure is illustrated by way of example and not limited in the accompanying figures, in which.

DETAILED DESCRIPTION

Figure 1:
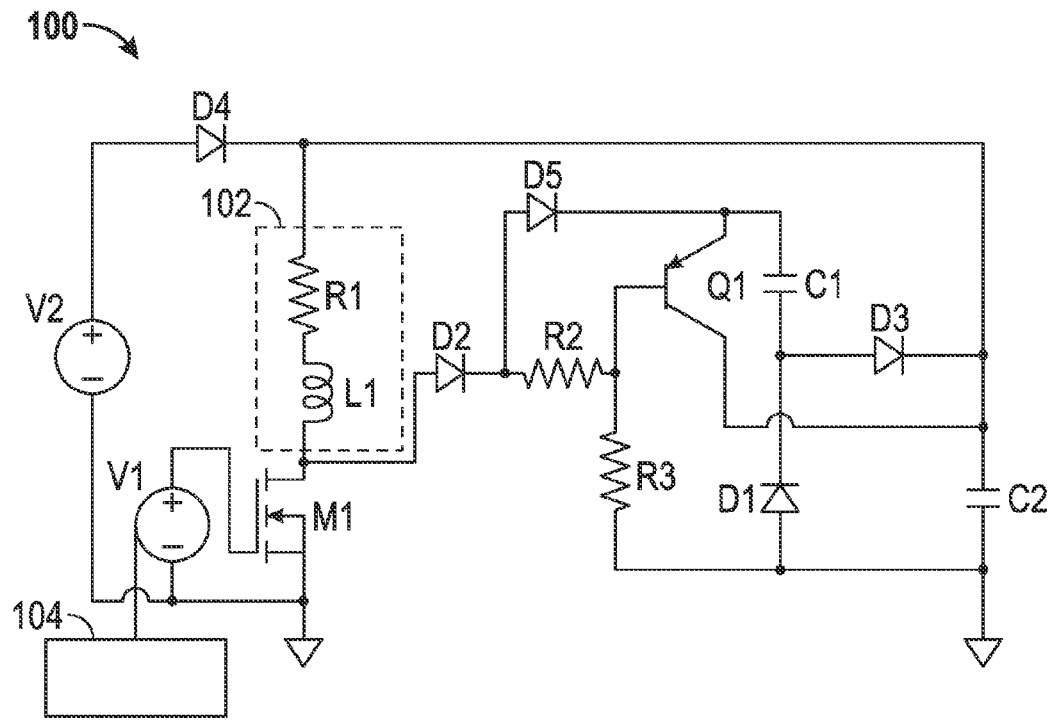
FIG. 1 illustrates an exemplary system circuit in accordance with one or more embodiments of the disclosure.

In accordance with one or more embodiments of the disclosure, a re-circulating fast discharge circuit for a coil may be provided. In some embodiments, the coil may be associated with a motor (e.g., a stepper motor), a solenoid, etc.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this regard, a coupling of entities, components, and/or devices may refer to either a direct connection or an indirect connection.

FIG. 1 illustrates an exemplary system circuit 100. The circuit 100 may be associated with one or more applications or environments, such as an aircraft. As described further below, the circuit 100 may be used to discharge or dump energy from a coil during a discharge phase into one or more capacitors. Energy stored in the capacitor(s) may then be used to drive the coil during a drive phase.

As shown in FIG. 1, the circuit 100 may include a number of components, such as power sources (V1-V2), diodes (D1-D5), transistors (M1 and Q1), capacitors (C1-C2), and resistors (R2 and R3). The power source V2 may serve as a primary system power source. The components of the circuit 100 may be coupled to one another in the manner shown in FIG. 1. As shown, the capacitor C2 may ordinarily be charged to approximately the same voltage as provided by the power source V2.

A resistor R1 and an inductor L1 may be associated with one another to form a coil 102 that may be selectively driven or discharged. The resistor R1 may be a physical component or just represent the resistance of the coil 102. The power source V1 may serve as a control source to selectively turn off or turn on the coil 102 by turning-on or turning-off (e.g. allowing or disallowing current flow through) the transistor M1. For example, the coil 102 may be turned off during a discharge phase by, e.g., turning-off the power source V1 (and in turn, turning-off the transistor M1), where current from the coil 102 may be dumped into the capacitor C1 which is connected in series with the capacitor C2. In this manner, the energy associated with the current through the coil 102 may be stored during the discharge phase. The coil 102 may be turned on during a drive phase by, e.g., turning-on the power source V1 (and in turn, turning-on the transistor M1). During the drive phase, the charge in the capacitor C1 may be transferred to the capacitor C2, allowing the energy that was stored during the discharge phase to be re-circulated, potentially as opposed to drawing from a power source (e.g., the power source V2).

As shown in FIG. 1, the diode D4 may be coupled to the power source V2 and the coil 102. The diode D4 may help to prevent a flow of charge (e.g., current) from the capacitor C2 to the power source V2.

During the discharge phase, the transistor M1 may be turned-off (via the power supply V1). Current flowing through the coil 102 may be "forced" or made to flow through the diode D2 coupled to the coil 102. A portion of that current flowing through the diode D2 may flow through resistors R2 and R3 coupled to the diode D2, and the remainder of the current flowing through the diode D2 may flow through the diode D5 coupled to the diode D2. The current flowing through the diode D5 may be used to charge the capacitor C1 coupled to the diode D5. The capacitor C1 may charge to a voltage level based on diode voltage drops associated with the diode D4 and the diode D3 coupled to the capacitors C1 and C2. Based on conduction properties/characteristics (e.g., generally uni-directional conduction) associated with the diodes, the diode D1 may be coupled to the capacitor C1, and when arranged as shown in FIG. 1, may be used to store charge on the capacitor C1.

During the drive phase, the transistor M1 may be turned-on via the power supply V1, such that the transistor M1 may conduct current. The turn-on of the transistor M1 may cause a low voltage (e.g., a voltage less than a threshold) to be applied to the base of the transistor Q1, which may cause the transistor Q1 to turn-on or conduct so as to transfer charge from the capacitor C1 to the capacitor C2 to drive current in the coil 102. In this manner, charge stored in the capacitor C1 during the discharge phase may be dumped into the capacitor C2 and used to drive current in the coil 102 during the drive phase. Thus, the circuit 100 may allow energy to be re-circulated.

The resistors R2 and R3 coupled to the transistor Q1 may be used to achieve a particular predetermined bias condition with respect to the transistor Q1. For example, values for the resistors R2 and R3 may be selected so as to turn-off Q1 when C1 charges (during the discharge phase) and to turn-on Q1 when C1 discharges (during the drive phase).

The circuit 100 is illustrative. In some embodiments, one or more of the components or devices shown may be optional. In some embodiments, one or more additional devices not shown may be included. In some embodiments, the components or devices may be organized or arranged in a manner different from what is shown in FIG. 1. In some embodiments, different types, styles, brands, or part numbers may be used for the components shown. Values for one or more of the components shown in FIG. 1 may be obtained via techniques known to those of skill in the art. For example, circuit analysis and/or simulation (e.g., computer simulation) may be used to select values for one or more of the components shown in FIG. 1.

Figure 2:
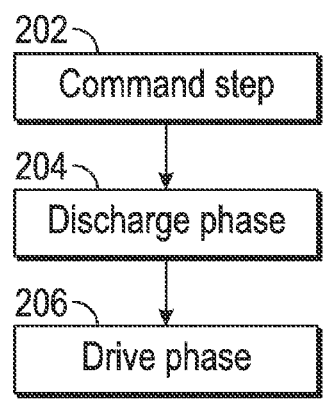
FIG. 2 illustrates an exemplary method in accordance with one or more embodiments of this disclosure.

FIG. 2 illustrates a method in accordance with one or more embodiments of this disclosure. In some embodiments, the method may execute in accordance with one or more systems, components, or devices, such as those described herein. The method of FIG. 2 may be used to discharge a coil and/or re-circulate energy. In some embodiments, the method of FIG. 2 may be used to increase a speed of a motor (e.g., a stepper motor) to provide better fuel control.

The method of FIG. 2 may be implemented using hardware, software, firmware, or any combination thereof. For example, in some embodiments a controller may be configured to select whether a circuit operates in a discharge phase or a drive phase based on a commanded step as described below. The controller may include at least one processor and memory having instructions stored thereon that, when executed by the at least one processor, cause the controller to perform one or more methodological acts. An example controller 104 is shown in FIG. 1, which may selectively control the power source V1.

Turning back to FIG. 2, in block 202, a step may be commanded. For example, a controller may command that a stepper motor is to step, which may entail energizing one or more coils and/or de-energizing one or more coils of the stepper motor.

In block 204, a polarity changing coil may be discharged in response to the step command of block 202. For example, the coil 102 may be commanded to discharge based on the output level or state of the power source V1. Shutting-off the power source V1 may result in current from the coil 102 being dumped into the capacitor C1 in series with the capacitor C2, thereby providing for a higher voltage and decreasing a de-energizing time.

In block 206, the polarity changing coil (e.g., the coil 102) may be driven in a direction opposite a direction associated with the discharge phase of block 204. During an energizing or drive phase associated with the block 206, charge in the capacitor C1 may be transferred to the capacitor C2, allowing the energy associated with the discharge phase of block 204 to be re-circulated during the drive phase of block 206. The power source V1 may be turned-on during the drive phase of block 206.

The blocks or operations shown in FIG. 2 are illustrative. In some embodiments, some of the operations (or portions thereof) may be optional. In some embodiments, additional operations not shown may be included. In some embodiments, the operations may execute in an order or sequence different from what is shown.

Embodiments of the disclosure may be used to provide a faster discharge time for a coil relative to prior techniques or solutions. For example, whereas prior techniques may return current to a source, or dissipate the associated energy in a resistor or transzorb, embodiments of the disclosure may use the current to charge one or more capacitors. Furthermore, during a drive phase, charge may be transferred from the capacitor(s) to allow for a re-circulation of energy, rather than drawing energy from a power source. The enhanced response time may be used to increase an operating speed of a motor.

In some embodiments various functions or acts may take place at a given location and/or in connection with the operation of one or more apparatuses or systems. In some embodiments, a portion of a given function or act may be performed at a first device or location, and the remainder of the function or act may be performed at one or more additional devices or locations. Aspects of the disclosure may be directed to one or more systems, apparatuses, and methods. In some embodiments, executable instructions may be stored on one or more media, such as a non-transitory computer readable medium. The instructions, when executed, may cause an entity to perform one or more methodological acts.

Aspects of the disclosure may be tied to particular machines. For example, in some embodiments a device or entity, such as a circuit, may function as a reverse charge pump to quickly discharge a coil and re-circulate energy associated therewith.

Aspects of the disclosure have been described in terms of illustrative embodiments thereof. Numerous other embodiments, modifications and variations within the scope and spirit of the appended claims will occur to persons of ordinary skill in the art from a review of this disclosure.

What is claimed is:

1. A method to discharge a coil, comprising:
   receiving a step command from a controller by a circuit in connection with a stepper motor;
   discharging a first current in the coil of the circuit to a capacitor coupled to the coil responsive to the step command; and
   driving a second current in the coil via a charge stored on the capacitor during the discharging of the first current in the coil,
   wherein the coil is a polarity changing coil driven in a direction opposite a direction associated with the discharging of the first current,
   wherein the discharging of the first current and the driving of the second current via the capacitor is a recirculation of energy.

2. The method of claim 1, wherein the second current driven in the coil is oriented in a direction that is opposite of a direction of the first current that is discharged.

3. The method of claim 1, wherein the capacitor is a first capacitor coupled to a second capacitor that is charged to a voltage provided by a power source.

4. The method of claim 3, further comprising:
   transferring the charge stored on the first capacitor to the second capacitor when driving the current in the coil.

5. The method of claim 1, further comprising:
   turning-on a power source to drive the second current in the coil; and
   turning-off the power source to discharge the first current in the coil.

6. A circuit configured to discharge a coil, comprising:
   a first power source configured to selectively turn-on and turn-off;
   a first capacitor that is charged by a discharge current associated with the coil when the power source turns-off; and a second capacitor that receives a transfer of charge from the first capacitor to drive a current in the coil from the second capacitor when the power source turns-on, wherein the coil is a polarity changing coil driven in a direction opposite a direction associated with the discharging of the first current, wherein the discharge current and the driving of the current in the coil from the second capacitor is a recirculation of energy.

7. The circuit of claim 6, further comprising:

a second power source configured to charge the second capacitor to a voltage as provided by the second power source.

8. The circuit of claim 6, wherein the coil is associated with a stepper motor.

9. The circuit of claim 6, wherein the coil is a solenoid.

10. The circuit of claim 6, further comprising:

a controller comprising a processor configured to selectively turn-on and turn-off the first power source.

11. A system for enhancing a speed of a stepper motor comprising:

a controller configured to send a step command to a circuit in connection with the stepper motor; and the circuit configured to:

discharge a first current in a coil of the circuit to a capacitor responsive to the step command; and drive a second current in the coil via a charge stored on the capacitor during the discharging of the first current in the coil, wherein the coil is a polarity changing coil driven in a direction opposite a direction associated with the discharge of the first current, wherein the discharge of the first current and the drive of the second current via the capacitor is a recirculation of energy.

12. The system of claim 11, wherein the capacitor is a first capacitor coupled to a second capacitor that is charged to a voltage as provided by a power source.

13. The system of claim 12, wherein the circuit is configured to:

transfer the charge stored on the first capacitor to the second capacitor when driving the current in the coil.

14. The system of claim 11, wherein the controller is configured to turn-on a power source to drive the second current in the coil and turn-off the power source to discharge the first current in the coil.

15. The method of claim 1, further comprising:

switching a transistor via a power supply to initiate the discharging of the coil, the step command causing the transistor to switch.

16. The method of claim 1, further comprising:

forcing the first current to flow through a diode coupled to the coil during the discharging of the first current in the coil.

17. The method of claim 1, further comprising:

supplying a first portion of the first current to at least one resistor; and supplying a second portion of the first current to the capacitor through a diode.

18. The method of claim 1, wherein the discharging of the first current and the driving of the second current causes an increase in a speed of the stepper motor while a force exerted on the stepper motor is maintained in accordance with the discharging of the first current and the driving of the second current.

* * * * *